Patented Aug. 24, 1937

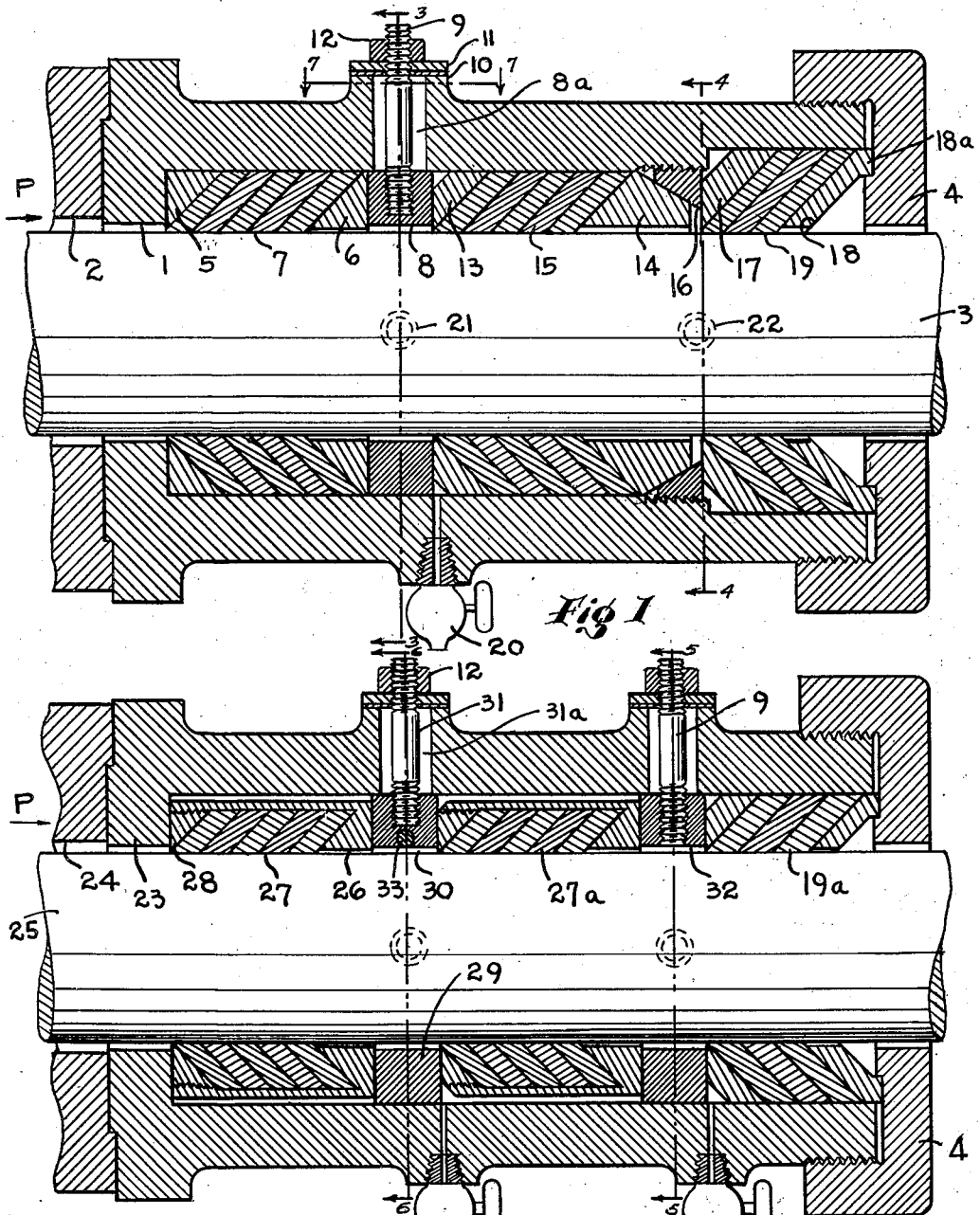

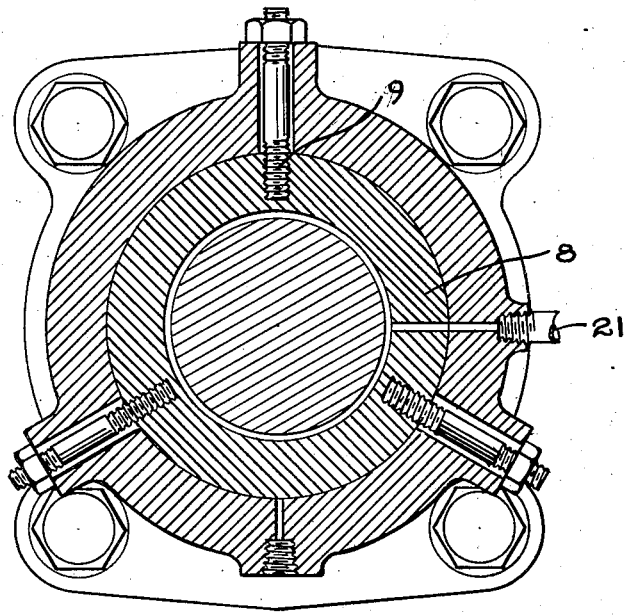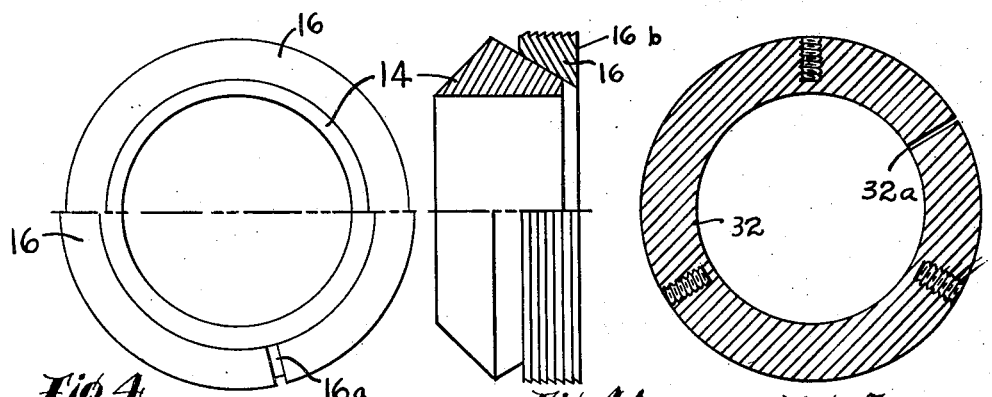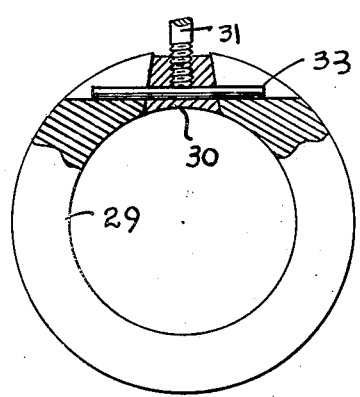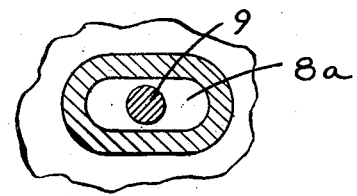

2,090,956

UNITED STATES PATENT OFFICE 2,090,956

MULTISTAGE ADJUSTABLE ROD-PACKING

Harley T. Wheeler, Dallas, Tex.

Application February 11, 1935, Serial No. 5,952

6 Claims. (Cl. 286—31)

My invention relates to packing and more particularly to packing employed in stuffing boxes to form a seal around a moving rod or shaft.

It is an object of the invention to provide an efficient type of rod packing which is capable of adjustment to provide for wear in combination with an adjustable movable partition between the separate stages.

I contemplate providing a fluid pressure relief in connection with each stage to thereby provide a packing having a minimum amount of friction upon the moving shaft.

The invention resides in the particular form and arrangement of the supports for the packing rings whereby they may be maintained in close contact with the rod.

Another object is to provide effective means for effecting a substantial support in a newly adjusted position for the packing rings when take-up is desired.

Another object of the invention is to provide a plurality of independent packing units to be employed in each of the stages of the stuffing box, each unit furnishing an effective fluid seal.

The invention will be more clearly understood from the description which follows taken in connection with the drawings wherein Fig. 1 is a central longitudinal section through a stuffing box with packing therein embodying my invention.

Fig. 2 is a similar section showing a slightly different embodiment of the inventive idea.

Fig. 3 is a transverse section on the plane 3—3 of Fig. 1.

Fig. 4 is an end elevation of the intermediate packing rings taken approximately on the plane 4—4 of Fig. 1.

Fig. 4a is a side view, partly in section, of the packing retaining means shown in Fig. 4.

Fig. 5 is a transverse section of the movable partition taken approximately on the plane 5—5 of Fig. 2.

Fig. 6 is an end view partly in section on the plane 6—6 of Fig. 2.

Fig. 6a is a side view, partly in section, of the partition shown in Fig. 6.

Fig. 7 is a broken detail illustrating the formation of the adjusting opening taken approximately on the line 7—7 of Fig. 1.

In the Fig. 1 embodiment of the invention I have shown a stuffing box of ordinary construction having an inner wall 1 adjacent the machine housing 2 and held in close contact therewith, said stuffing box being formed to accommodate a plurality of stages of packing rings and being closed on its outer end about the shaft 3 by means of an adjustable gland 4.

The inner stage of packing is adapted to fit against the inner wall 1 of the stuffing box and is made up of a series of frusto-conical shaped packing rings 7, preferably of porous packing material. There is an inner adapter ring 5 fitting between the packing rings and the wall 1 to form an end support for the rings. An outer ring 6 of similar construction supports the outer of the packing rings. It is to be understood that these rings may be compressed longitudinally between the adapter rings 5 and 6 and thereby forced tightly against the rod or shaft 3.

An adjustable partition ring 8 separates the first stage just described from an intermediate stage of packing made up of similar packing rings 15 supported at their inner ends by the adapter ring 13. On the outer end of the intermediate stage is an adapter ring 14, the forward face of which is tapered to fit against the outer face of the outermost packing ring. Said adapter ring 14 has an upper beveled face to interfit with a locking ring 16. Said locking ring is formed on its outer face with a series of outwardly projecting ridges, the forward or inner faces of which are inclined and adapted to engage within grooves in the inner wall of the stuffing box.

The construction of the ring 16 is shown best in Figs. 4 and 4a. The adapter ring is shown as interfitting with the locking ring 16, said locking ring being divided at one point 16a, so that it may be radially adjustable. It will be seen that when a compressive force is exerted against the outer flattened face 16b of the locking ring it may be moved inwardly; the outer serrations in the ring being held resiliently in the grooves of the stuffing box will be allowed to yield and when the ring is adjusted inwardly it will be automatically locked against forward outward movement. The beveled outer face of the adapter ring 14 will hold the locking ring in locking engagement with the walls of the stuffing box.

This adjustment of the inner and intermediate stages of packing is accommodated by the particular structure of the partition wall 8 which will now be described. Said wall is made up of a continuous ring of metal such as steel, the outer surface of which fits closely but slidably with the inner wall of the stuffing box. The ring is provided with threaded sockets on its outer face and I have shown three of such sockets into which are screwed posts, 9. Each post extends radially outward away from the ring and through an opening 8a, which is elongated longitudinally of the stuffing box, as shown in Fig. 7, thus providing for adjustment of the post 9 longitudinally of the box. The outer end of the post is threaded to receive the nut 12. A gasket 10 and a plate 11 are employed to form a sealing cover over the outer end of the chamber or recess 8a. It will be seen that when the packing is adjusted the nut 12 may be released sufficiently to allow the partition 8 to be adjusted after which it will be again tightened into position.

There is an additional outer stage of packing consisting of packing rings 19 of frusto-conical shape but of larger external diameter than the previous packing rings, the stuffing box being enlarged to receive said rings. To support the outer packing rings 19 there is an adapter ring 17 and an outer adapter ring 18 serving such purpose. The outer ring 18 has a projection indicated at 18a at its outer margin for contact with the inner wall of the gland 4 whereby the compression of said gland may be exerted upon the packing.

It will be seen that if the partition 8 is loosened by the adjustment of the nuts 12 the compression of the gland 4 may be exerted longitudinally throughout the length of the packing installation, and that the partition 8 may then be fixed so that it furnishes substantial support against the longitudinal thrust of the pressure fluid upon the packing at that point. The thrust of the pressure fluid upon the packing rings 15 will be taken up by the locking ring 16 and the gland itself will serve to take the thrust of the outer stage of packing.

I provide a lateral opening with a petcock 20 secured therein which may be opened when it is desired to blow the grit or other abrasive material from the stuffing box when occasion arises. There is also a vent indicated in Fig. 1 at 21 and 22, which I propose to connect with other portions of the device having similar pressure. These vents provide the escape of excess pressure fluid at the points indicated and provide for reduction of pressure at these points.

In the installation shown in Fig. 2 the stuffing box is provided with an inner wall 23 fitting against the outer portion 24 of the machine housing. The rod 25 is movable through the stuffing box and the machine wall.

The interior of the stuffing box has three stages as in the other embodiment. The inner stage comprises packing rings 27 fitting within a floating packing cup 26. The inner end of said cup is provided with an inclined wall to support the packing rings and at the outer end of the cup is secured an adapter ring 28 by means of which the packing rings are compressed within the cup. The intermediate stage is similar in construction, the two stages being separated by a partition 29, which is adapted to be adjusted longitudinally of the box as in the previous embodiment.

As shown in Fig. 6, the ring 29 is divided at one point and a wedge-shaped block 30 is fitted therein, thus providing means whereby the outward movement of the wedge block 30 will expand the ring so that its outer surface will frictionally engage with the inner wall of the stuffing box. Said expanding block 3 is moved radially outward by means of a post 31 fitting within an elongated opening 31a and it will be seen that when the nut 12 is tightened upon said post 31 the block will be moved outwardly to expand the ring. To prevent movement of the block 30 inwardly beyond a predetermined point I provide a transverse pin 33 fitting within a slot in the outer wall of the partition, said pin extending through the block and limiting the movement of the block into contact with the rod. It will be seen that this partition is longitudinally adjustable in the same manner as the previously described partition, and may be locked frictionally in position when properly adjusted. The intermediate packing section 27a is separated from the outer stage of packing 19a by the partition or wall 32. This wall is made up of a ring fitting frictionally within the housing and longitudinally split or divided at 32a to allow said ring to be expanded. A series of posts 9 similar to those employed in the ring 8 are threaded into the ring and adapted to exert an outward pull thereon to hold the ring frictionally into engagement with the wall of the box. This ring has the same construction as that described in reference to Fig. 1. In this embodiment are provided petcocks 20 adjacent each of the partitions, as was provided in the Fig. 1 embodiment.

It will be seen that I have provided a multiple stage stuffing box in which there is a substantial thrust-taking partition between the separate stages and that such partition may be adjusted longitudinally of the box when it becomes necessary to compress the packing further by longitudinal adjustment. These partitions prevent the transmission of the thrust of one stage from the next adjacent stage and make it possible to more readily form a seal with said packing without excessive friction between the rings and the shaft. The excess of pressure at each stage may be vented to the outside through openings 21 and 22 so that the escape of fluid along the shaft will be most effectively prevented. By thus reducing the pressure by stages along the shaft I am enabled to substantially reduce the amount of friction between the rings and the shaft so that in the outermost section of the packing the pressure and the resulting friction will be but slight. The advantages of this arrangement will be obvious to those skilled in the art.

What I claim as new is:

1. A stuffing box for rods including an inner stationary wall, a plurality of sets of packing rings in said box, partitions adjustable longitudinally of said box separating said sets, one of said partitions comprising an endless ring of hard material fitting the inner wall of said box, radially extending posts secured in said ring and projecting through openings in the wall of said box elongated in a direction parallel with the axis of the box, means to seal said openings and means to fix said posts and said ring rigidly in adjusted position.

2. A stuffing box for rods including an inner stationary wall, a plurality of sets of packing rings in said box, partitions adjustable longitudinally of said box separating said sets, one of said partitions comprising a ring of hard material fitting the inner wall of said box, radially extending posts secured in said ring and projecting through elongated openings in the wall of said box, means to seal said openings, nuts on the outer ends of said posts adapted to exert an outward pull on said posts and clamp said posts rigidly in position, and pressure relief means at one end of each of said partitions.

3. A stuffing box, a plurality of sets of packing rings in said box adapted to fit about a rod, partitions between said sets, an outer gland formed to compress said sets longitudinally of said box, means to fix one of said partitions after adjustment including radially extending posts projecting through and adjustable longitudinally of said box in said openings in the wall of said box, means to fix said posts against movement, and means to seal said openings about said posts.

4. A stuffing box, a plurality of sets of packing rings in said box adapted to fit about a rod, partitions between said sets, an outer gland formed to compress said sets longitudinally of said box, one of said partitions including a locking ring of steel, an adapter ring having a wedging fit with said locking ring and adapted to wedge said locking ring outwardly when said gland is tightened, and means on said locking ring engaging the inner wall of said box to retain said locking ring against movement toward said gland.

5. A stuffing box, a plurality of sets of packing rings therein to seal about a moving rod, said packing rings being of frusto-conical shape, a gland on said box, adapter rings at the ends of each set of packing rings, one of said adapter rings having a beveled outer face, a locking ring engaging said beveled face and adapted to be wedged against the inner wall of said box when compressed by said gland, and serrations on the locking ring and box adapted to interengage to prevent movement of said locking ring outwardly along said shaft.

6. A stuffing box, a plurality of sets of packing rings therein to seal about a moving rod, said packing rings being of frusto-conical shape, a gland on said box, adapter rings at the ends of each set of packing rings, one of said adapter rings having a beveled outer face, a locking ring engaging said beveled face and adapted to be wedged against the inner wall of said box when said locking ring is tightened in place, and interengaging means on said locking ring and said box to prevent release of said packing when compressed by said locking ring.

HARLEY T. WHEELER.